United States Patent [19]

Hatzidimitriu

[11] Patent Number: 4,936,962

[45] Date of Patent: Jun. 26, 1990

[54] PROCESS FOR ADJUSTING THE PH OF AN AQUEOUS FLOWABLE FLUID

[75] Inventor: Stratos E. Hatzidimitriu, San Jose, Calif.

[73] Assignee: FMC Corporation, Philadelphia, Pa.

[21] Appl. No.: 317,328

[22] Filed: Mar. 1, 1989

[51] Int. Cl.$^5$ ............................ C25B 3/00; A23L 2/22
[52] U.S. Cl. ................................ 204/182.3; 204/182.6; 204/131
[58] Field of Search ............... 204/182.6, 182.3, 296, 204/131

[56] References Cited

U.S. PATENT DOCUMENTS

| | | | |
|---|---|---|---|
| 512,133 | 1/1894 | Vander Weyde et al. | |
| 751,179 | 2/1904 | Kollrepp et al. | |
| 1,256,758 | 2/1918 | Williams | |
| 1,915,568 | 8/1928 | Gortner et al. | |
| 1,972,561 | 3/1932 | Heubaum | 204/1 |
| 2,089,116 | 8/1937 | Dyckerhoff | 99/69 |
| 2,159,074 | 5/1939 | Briggs | 204/34 |
| 2,631,100 | 3/1953 | Aten et al. | 99/57 |
| 2,671,055 | 3/1954 | Aten et al. | 204/131 |
| 2,688,572 | 9/1954 | Warshaw | 127/54 |
| 2,830,905 | 4/1958 | Block et al. | 99/54 |
| 3,165,415 | 1/1965 | Kilburn et al. | |
| 3,201,245 | 8/1965 | Clark et al. | 99/57 |
| 3,290,173 | 12/1966 | Marino | 127/63 |
| 3,369,906 | 2/1968 | Chen | 99/77 |
| 3,433,726 | 3/1969 | Parsi et al. | 204/180 |
| 3,447,930 | 6/1969 | Francis | 99/57 |
| 3,475,216 | 10/1969 | Walon | 127/46 |
| 3,547,657 | 12/1970 | Otsuka et al. | 99/111 |
| 3,666,647 | 5/1972 | Kubo et al. | 204/180 P |
| 3,687,682 | 8/1972 | Scheder | 99/57 |
| 3,709,802 | 1/1973 | Okuhara et al. | 204/137 R |
| 3,781,174 | 12/1973 | Nishijima et al. | 127/46 A |
| 3,845,226 | 10/1974 | Goujard | 426/239 |
| 3,865,960 | 2/1975 | Wucherpfennig et al. | 426/239 |
| 3,968,017 | 7/1976 | Canata et al. | 204/180 P |
| 4,124,458 | 11/1978 | Moeglich | 204/182.4 |
| 4,138,501 | 2/1979 | Chaveron et al. | 426/329 |
| 4,160,713 | 7/1979 | Matsuzaki et al. | 204/180 P |
| 4,212,891 | 7/1980 | Fujita et al. | 426/321 |
| 4,253,929 | 3/1981 | Keritsis | 204/301 |
| 4,264,631 | 4/1981 | Rose | 426/247 |
| 4,317,841 | 3/1982 | Brambilla et al. | 426/329 |
| 4,322,448 | 3/1982 | Matsuura et al. | 426/490 |
| 4,374,714 | 2/1983 | Hekal | 204/131 |
| 4,391,680 | 7/1983 | Mani et al. | 204/296 |
| 4,401,678 | 8/1983 | Beaumont | 426/15 |
| 4,492,601 | 1/1985 | Nakasone et al. | 127/48 |
| 4,523,959 | 6/1985 | Exertier | 127/46 |
| 4,539,212 | 9/1985 | Hunter | 426/123 |
| 4,643,902 | 2/1987 | Lawhon et al. | 426/271 |
| 4,670,125 | 6/1987 | Mueller et al. | 204/296 |
| 4,766,161 | 8/1988 | Chlanda et al. | 521/27 |

Primary Examiner—John F. Niebling
Assistant Examiner—Arun S. Phasge
Attorney, Agent, or Firm—Richard E. Elden; Alan J. Moore

[57] ABSTRACT

A process is provided to adjust the acidity of a flowable fluid by the electrodialysis in a cell containing membrane pairs comprising a bipolar membrane and an ion selective membrane.

18 Claims, 1 Drawing Sheet

PROCESS FOR ADJUSTING THE PH OF AN AQUEOUS FLOWABLE FLUID

A process is provided to increase or decrease the acidity of a flowable fluid.

Acidity is an important factor that can affect processing characteristics, storage stability, and organoleptic attributes of food and other products. Acidity in aqueous fluids is frequently measured by pH, the negative logarithm of the hydrogen ion concentration.

By increasing the acidity (lowering the pH), or decreasing the acidity (increasing the pH), the taste of products can be improved, the viscosity can be modified, the color and protein stability can be enhanced, and microbial spoilage can be controlled. For example, it is necessary to utilize pressure cookers for processing California tomato juice. If the normal pH of around 4.2 were lowered by about 0.2 to 0.3 unit, pressure would not be required for the heat treatment.

It has been recognized for a long time that the pH of a solution can be changed by electrodialysis, transfer of hydrogen ions or hydroxyl ions through a porous diaphragm. For example, U.S. Pat. No. 751,179 teaches that alkali can be removed from a juice in an anode compartment by electrodialysis. However, the process forms acids at the anode which must be removed by adding lead saccharate, thereby neutralizing the acid formed.

Three compartment electrodialysis cells, with the solution to be treated in the intermediate cell without an electrode, avoid the problems of changing the composition of the fluid by oxidation reactions at the anode or reduction reactions at the cathode. However, even when compartments are separated with anion permeable membranes or cation permeable membranes as in U.S. Pat. No. 3,369,906 there is a disadvantage in that ions transferred into the solution from the adjacent compartment are "chemical additives". Further, the process can result in inadvertent contamination from a solution in an adjacent compartment. U.S. Pat. No. 4,317,841 employs chitosan, an amino-bearing polysaccharide, in combination with electrodialysis for adjusting acidity. Such a process while effective for deacidifying coffee is not useful for increasing the acidity (lowering the pH) of a flowable fluid or of treating a fluid containing suspended matter, such as fruit pulp.

U.S. Pat. No. 4,264,631 teaches a process for decreasing the acidity of ground meat chunks by adding salt and electrolyzing the mixture in a cell without separating means. Such a cell will generate chlorine at the anode and hydrogen at the cathode as well as sodium hydroxide.

The present invention overcomes the problems of the prior processes by providing a process for adjusting the pH of an aqueous flowable fluid comprising introducing the flowable fluid into a compartment of an electrolytic cell, said electrolytic cell comprising an anode compartment containing an anode and an anolyte, a cathode compartment containing a cathode and a catholyte, and an odd number of intermediate compartments, each containing a solution, either a flowable fluid or an electrolyte, the compartments being separated by pairs of membranes in alternating sequence, each pair consisting of a bipolar membrane with an anion permeable surface and a cation permeable surface and an ion selective membrane permeable either to cations or to anions, the pairs of membranes being aligned such that the anion permeable surface of the bipolar membrane is proximal to the anode, and the ion selective membrane is situated between the bipolar membrane and the electrode corresponding to its selectivity, the flowable fluid being introduced into an intermediate compartment, inducing a direct current to flow through the cell by applying a voltage, said voltage being sufficient to urge ions through the ion selective membrane and to incorporate hydrogen ions into the solution on the more electronegative side of the bipolar membrane, and to incorporate hydroxyl ions into the solution on the more electropositive side of the bipolar electrode thereby adjusting the pH of the flowable fluid.

Bipolar membranes are known to be useful for their ability to rectify alternating current, to improve desalination processes, to act as analogs of certain biological membranes, and to split water in the electrodialysis of acids and bases from salts. Bipolar membranes prepared by various procedures have been reported in the literature. For example, bipolar membranes have been prepared by adhering together two membranes consisting of oppositely charged ion exchange resins in an inert matrix by means of heat and pressure or by means of an adhesive paste (U.S. Pat. No. 2,829,905). Anion and cation exchange membranes have also been fused together by means of heat and pressure to form bipolar membranes as disclosed in U.S. Pat. No. 3,372,101.

A bipolar membrane acts as a barrier to both cations and anions, but when subjected to sufficient electric potential dissociates water into hydrogen ions which are incorporated into the solution on the more electronegative side of the membrane from the cation permeable surface and into hydroxyl ions which are incorporated into the solution on the more electropositive side of the membrane. Therefore, the bipolar membrane does not transport ions from one electrolyte into the solution to be treated, but incorporates either hydrogen ions or hydroxyl ions into the solution to be treated by dissociating the water therein.

For the purpose of this invention a flowable fluid can be urged to flow through conduit means and can conduct an electrical current, by transfer of ions when subjected to an electric potential gradient, the flowable fluid is an electrolyte which may contain solids, colloids, gases and the like and may have a very high viscosity. Exemplary flowable fluids may contain solids, such as pulp in a fruit juice, or fibers and cell fragments in tomato paste. Other exemplary flowable fluids include sugar syrups, wine, sauces, vegetable juices, aqueous emulsions, mineral slurries and the like.

The best mode of practicing the invention is illustrated to one skilled in the art by reference to FIGS. 1 to 3.

FIG. 1. ACIDIFYING A FLOWABLE FLUID

Figure 1:
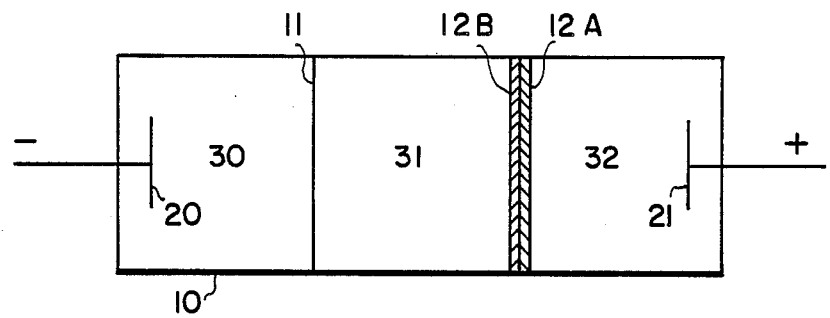
FIG. 1 shows an embodiment of the invention employing a cell containing a single pair of membranes, a single cation permeable membrane and a single bipolar membrane.

FIG. 1 comprises cell 10 containing cation permeable membrane 11 defining cathode compartment 30 containing cathode 20, and bipolar membrane 12 defining anode compartment 32 containing anode 21 and intermediate compartment 31. Bipolar membrane is aligned so that anion permeable surface 12A is proximal to anode 21 and cation permeable surface 12B is distal to anode 21 (proximal to cathode 20). Cation permeable membrane 11 being between the bipolar membrane 12 and cathode 20. The cathode and anode compartments both contain a suitable electrolyte, such as potassium hydroxide, sodium chloride or the like and the intermediate compartment contains a flowable fluid.

In operation a voltage between anode 21 and cathode 20 from a power source (not shown) urges a flow of electricity through cell 10 by movement of ions in the electrolyte and flowable fluid, by the transfer of cations from the flowable fluid in the intermediate compartment 31 through cation permeable membrane 11 into electrolyte in cathode compartment 30, and by the dissociation of water from aqueous fluid and/or anolyte in bipolar membrane 12 with hydroxyl ions being transferred into the electrolyte in anode compartment 32 and hydrogen ions being transferred into intermediate compartment 31 thereby acidifying the flowable fluid contained therein and lowering its pH.

FIG. 2. DEACIDIFYING A FLOWABLE FLUID

Figure 2:
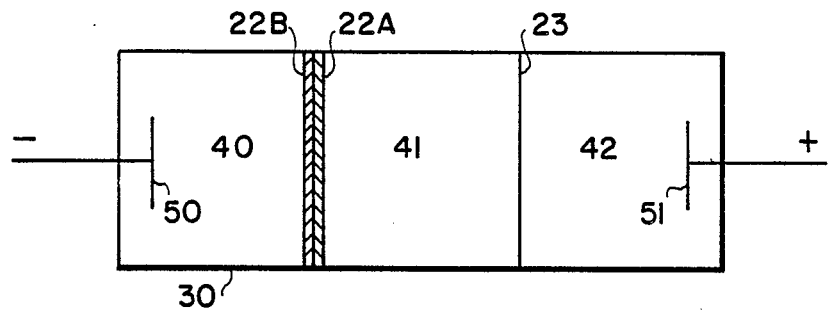
FIG. 2 shows an embodiment of the invention employing a single pair of membranes, a single bipolar membrane and a single anion permeable membrane.

FIG. 2 comprises cell 30 containing anion permeable membrane 23 defining anode compartment 42 containing anode 51, and bipolar membrane 22 defining cathode compartment 40 containing cathode 50 and intermediate compartment 41. Bipolar membrane is aligned so that anion permeable surface 22A is proximal to anode 51 and cation permeable surface 22B is distal to anode 51 (proximal to cathode 50). Anion permeable membrane 23 being between bipolar membrane 22 and anode 51. The cathode and anode compartments both contain electrolytes such as potassium chloride potassium hydroxide, hydrochloric acid or the like and intermediate compartment containing a flowable fluid.

In operation a voltage from a power source (not shown) urges a flow of electricity through the cell in a manner similar to the operation in FIG. 1 except anions are transferred from the flowable fluid in compartment 41 into compartment 42 and hydrogen ions from the dissociation of water in bipolar membrane 22 are transferred into catholyte compartment 40 while hydroxyl ions are transferred into intermediate compartment 41 thereby reducing the acidity of the flowable fluid therein and increasing the pH.

FIG. 3. A PLURALITY OF MEMBRANE PAIRS

Figure 3:
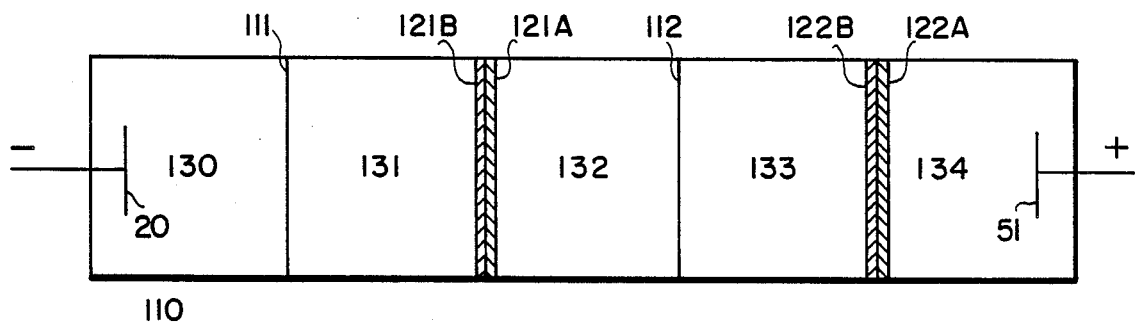
FIG. 3 shows an embodiment of the invention employing two pairs of membranes, cation permeable and bipolar membranes.

FIG. 3 shows cell 110 containing a first membrane pair, cation permeable membrane 111 and bipolar membrane 121; and a second membrane pair, cation permeable membrane 112 and bipolar membrane 122 aligned as in FIG. 1 defining intermediate compartments 131 and 133, cathode compartment 130 containing cathode 120, anode compartment 134 containing anode 151 and electrolyte compartment 132. Intermediate compartments 131 and 133 each contain flowable fluids to be acidified as in FIG. 1 while compartments 130, 132 and 134 contain an aqueous electrolyte. However, it is within the scope of this invention that compartment 132 could contain a second flowable fluid to be deacidified by hydroxyl ions from bipolar membrane 121 and concomitantly enriched with cations transferred from compartment 133 through membrane 112. In one embodiment of this invention this could be accomplished in compartment 132 concomitantly with acidification of the same or another flowable fluid in either compartment 133 or compartment 131. Also compartments 131 and 133 could contain the same flowable fluid, different flowable fluids, or if operated continuously, the flowable fluid from one compartment could be directed into another compartment for subsequent treatment. It is within the scope of this invention that many membrane pairs may be added to a cell, not merely one or two pairs. It is also within the scope of this invention that a single flowable fluid or a plurality of flowable fluids may be employed.

In FIGS. 1, 2 and 3 the compartments are illustrated for batch operation with neither inlets nor outlets. It is intended that the cells could be operated on a continuous flow basis by adding suitable inlet and outlet means. Means, such as pumps or differences in static heads could be employed to urge flowable fluids and electrolytes. Further, temperature control means, such as heaters, cooling coils and the like could be employed to maintain temperatures as desired.

One skilled in the art will recognize that the electrolytes in the anode, cathode and electrolyte compartments will act as "concentration cells" and affect the voltage drop between the compartments. Consequently one would desirably select an electrolyte containing ions which would minimize the voltage drop and provide sufficient conductivity of the electrolyte.

The following examples illustrate an embodiment of the invention in which a starch solution is acidified (reduced in pH) in order to promote hydrolysis of the starches to sugar and are not intended to limit the invention.

EXAMPLE 1

Preparation of Jerusalem artichokes

One liter of juice as obtained by the extraction of dried Jerusalem artichoke chips containing about 20% inulin is filled into the central compartment of a three-compartment cell of FIG. 1. The cross-section of the apparatus is approximately 1 square decimeter and the distance between the two membranes 18 centimeters. The electrodes are graphite and are placed in the outer compartments about 5 millimeters from the diaphragms. With the juice and its accompanying impurities in the central compartment and the electrodes immersed in water, the current is turned on and the voltage regulated so that a current density of about 1 amp. per square decimeter is maintained.

The juice in the middle compartment rapidly becomes acidic; at the same time a considerable flocculation of colloidal material takes place. After a pH of 3 is reached the juice is hydrolyzed at 125° C. for 40 minutes. It is then filtered through charcoal, neutralized with sodium hydroxide, and concentrated. The resulting syrup is very sweet.

EXAMPLE 2

Inversion of potato starch

Raw potatoes are mashed and filled into the intermediate compartment as in Example 1. After having obtained a pH of 3 the juice is hydrolyzed with pressure by heating to 135° C. After bonechar treatment the neutralization is carried out in the cathode compartment of the same apparatus.

EXAMPLE 3

Preparation of beet syrup

In the manufacture of beet or cane syrup a partial inversion of the sucrose is necessary in order to prevent crystallization. The inversion has most easily been attained in the manner described under Example 1.

EXAMPLE 4

Acidification of grape juice

One liter of grape juice is urged into the central compartment of a three-compartment cell of FIG. 1. The cross-section of the apparatus is approximately 1 square decimeter and the distance between the two membranes 18 centimeters. The electrodes are graphite and are placed in the outer compartments about 5 millimeters from the diaphragms. With the juice and its accompanying impurities in the central compartment and the electrodes immersed in water, the current is turned on and the voltage regulated so that a current density of about 1 amp. per square decimeter is maintained. The juice in the middle compartment rapidly becomes acidic.

I claim:

1. Process for adjusting the pH of an aqueous flowable fluid consisting of introducing a flowable fluid selected from the group consisting of sugar syrups, wine, sauces, vegetable and fruit juices and tomato paste, into a compartment of an electrolytic cell, said electrolytic cell comprising an anode compartment containing an anode and an anolyte, a cathode compartment containing a cathode and a catholyte, and an odd number of intermediate compartments each containing a solution, either a flowable fluid or an electrolyte, the compartments being separated by pairs of membranes in alternating sequence each pair consisting of a bipolar membrane with an anion permeable surface and a cation permeable surface and an ion selective membrane permeable either to cations or to anions, the pairs of membranes being aligned such that the anion permeable surface of a bipolar membrane is proximal to the anode, and the ion selective membrane is situated between the bipolar membrane and the electrode corresponding to its selectivity, the flowable fluid being introduced into an intermediate compartment, inducing a direct current to flow through the cell by applying a voltage, said voltage being sufficient to urge ions through the ion selective membrane and to incorporate hydrogen ions into the solution on the more electronegative side of the bipolar membrane, and to incorporate hydroxyl ions into the solution on the more electropositive side of the bipolar membrane thereby adjusting the pH of the flowable fluid without transporting ions into the flowable fluid.

2. Process of claim 1 wherein the pH of the flowable fluid is decreased and the ion selective membrane is a cation permeable membrane.

3. Process of claim 1 wherein the pH of the flowable fluid is increased and the ion selective membrane is an anion permeable membrane.

4. Process of claim 1 wherein the cell contains a plurality of membrane pairs.

5. Process of claim 2 wherein the cell contains a plurality of membrane pairs.

6. Process of claim 3 wherein the cell contains a plurality of membrane pairs.

7. Process of claim 1 wherein the flowable fluid from one intermediate compartment is directed into another intermediate compartment.

8. Process of claim 2 wherein the flowable fluid from one intermediate compartment is directed into another intermediate compartment.

9. Process of claim 3 wherein the flowable fluid from one intermediate compartment is directed into another intermediate compartment.

10. Process of claim 4 wherein the flowable fluid from one intermediate compartment is directed into another intermediate compartment.

11. Process of claim 5 wherein the flowable fluid from one intermediate compartment is directed into another intermediate compartment.

12. Process of claim 6 wherein the flowable fluid from one intermediate compartment is directed into another intermediate compartment.

13. Process of claim 1 wherein a second flowable fluid is concomitantly introduced into another intermediate compartment.

14. Process of claim 2 wherein a second flowable fluid is concomitantly introduced into another intermediate compartment.

15. Process of claim 3 wherein a second flowable fluid is concomitantly introduced into another intermediate compartment.

16. Process of claim 4 wherein a second flowable fluid is concomitantly introduced into another intermediate compartment.

17. Process of claim 5 wherein a second flowable fluid is concomitantly introduced into another intermediate compartment.

18. Process of claim 6 wherein a second flowable fluid is concomitantly introduced into another intermediate compartment.

* * * * *